United States Patent Office 3,631,043
Patented Dec. 28, 1971

3,631,043
DI- AND TRIPHENYLPROPYL PIPERAZINE
COMPOUNDS
Gilbert Regnier, Sceaux Village, Roger Canevari, La Hay-les-Roses Village, and Jean-Claude Le Douarec, Suresnes Village, France, assignors to Societe en nom collectif "Science Union et Cie, Societe Francaise de Recherche Medicale," Suresnes, France
No Drawing. Filed Mar. 8, 1968, Ser. No. 711,496
Claims priority, application Great Britain, Mar. 14, 1967, 11,843/67
The portion of the term of the patent subsequent to Mar. 25, 1986, has been disclaimed
Int. Cl. C07d 51/70
U.S. Cl. 260—250 A          7 Claims

ABSTRACT OF THE DISCLOSURE 1-(di- and triphenylpropyl piperazines substituted in 4-position by: pyridyl, pyridazin-2-yl, pyrazin-2-yl, S-triazinyl, thiazol-2-yl, imidazol-2-yl, isoxazolyl, 1,2,4-thiadiazolyl, 1,2,4-oxadiazolyl, tetrazol-5-yl; all these heterocyclic radicals being optionally substituted by one or more lower-akyl up to $C_5$ inclusive, amino, mono-lower alkylamino or alkyleneamino.

These compounds possess analgesic, anti-inflammatory and antitussive properties.

The present invention provides di- and triphenylpropyl piperazine derivatives of the general Formula I

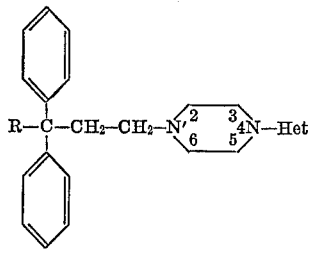

(I)

where:

R represents hydrogen or a phenyl radical,

Het represents an unsaturated 5- or 6-membered heterocyclic radical containing 1 to 4 nitrogen atoms, with optionally an oxygen or sulfur atom, selected from the radicals corresponding to the nuclei:

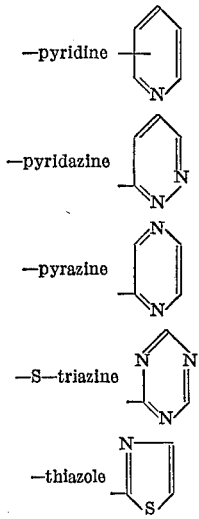

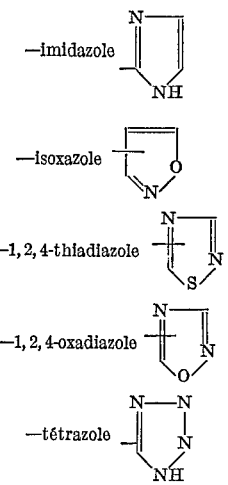

These heterocyclic radicals may be substituted by one or more lower-alkyl radicals containing up to 5 carbon atoms, or by amino, monoalkyl- or alkylene-amino radical, such as —NHR' wherein R' stands for a lower-alkyl radical having up to 5 carbon atoms in a straight or branched chain, a cyclopropyl methyl radical or an alkylene radical

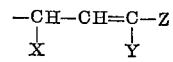

wherein X, Y, and Z represent simultaneously or alternatively a hydrogen atom or a methyl radical.

Moreover, X, Y or Y, Z may represent a polymethylene chain containing 2 to 6 carbon atoms.

It is known from our co-pending patent application Ser. No. 599,714 filed Dec. 7, 1966, now U.S. 3,435,036, granted Mar. 25, 1969, to prepare 1-di- and triphenylpropyl piperazines substituted in 4-position by pyrimidyl or benzopyrimidyl radicals. We have now found that substituents other than pyrimidyl radical, attached to the 1-di- and triphenylpropyl piperazines, provide interesting compounds.

The new compounds of this invention possess valuable pharmacological and therapeutic properties and may therefore be used as medicaments, especially as pain killers and for the treatment of inflammation as well as cough.

These new compounds may be prepared by condensing a halogenated compound of the general formula Het—Z'       (II)

where Het has the meaning given above and Z' represents a chlorine or bromine atom, with an N-monosubstituted piperazine of the general Formula III

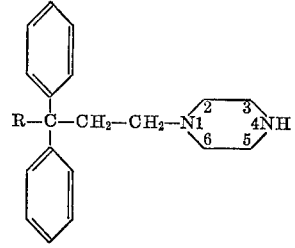

(III)

where R has meaning given above.

An advantageous process for preparing these compounds consists in operating in a polar solvent selected from the usual high-boiling alcohols, for example, butanol or isopentanol, aliphatic sulfoxides such as dimethylsulfoxide, or in an N,N-disubstituted aliphatic amide, for example, dimethylformamide or dimethylacetamide. The reaction is advantageously carried out within the temperature range from 120 to 200° C. in the presence of an acceptor for the hydrohalic acid formed in the course of the reaction. This acid acceptor may be the selected N-monosubstituted piperazine, used in excess, or an alkaline or alkaline earth metal carbonate such, for example, as sodium or potassium bicarbonate or carbonate, calcium carbonate, or an organic tertiary base such, for example, as dimethylaniline, pyridine or triethylamine.

Alternatively, the condensation of the said halogenated compounds may be carried out in the presence of an excess of the selected N-monosubstituted piperazine, which acts at the same time as solvent and acceptor for the hydrohalic acid at a temperature ranging from 120 to 200° C.

The new compounds thus obtained in the form of weak bases can be converted by means of acids into acid addition salts, especially physiologically tolerable acid addition salts, which are likewise included in this invention. These acid addition salts are obtained by reacting the new compounds with acids in suitable solvents, for example, water or a water-miscible alcohol. For this purpose there may be used mineral acids such, for example, as hydrochloric, hydrobromic, methanesulfonic, isethionic, sulfuric, phosphoric or sulfamic acid, or organic acids such, for example, as acetic, propionic, maleic, fumaric, tartaric, citric, oxalic or benzoic acid.

If desired, the new compounds may be purified by physical methods, such as crystallization or chromatography, or chemically, for example by formation of acid addition salts and decomposition of these salts by means of alkaline agents.

The following examples illustrate the invention, but are not to be construed as limiting. The melting points have been determined on a Kofler heater under a microscope, unless otherwise indicated.

EXAMPLE 1

1-(3',3',3'-triphenylprop-1'-yl)-4-(pyrid-2''-yl) piperazine

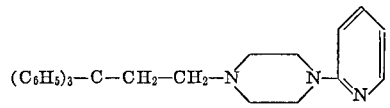

A solution of 15.8 grams of 2-bromo-pyridine and 35.6 grams of 1-(3',3',3'-triphenylprop-1'-yl)-piperazine, melting at 131° C., in 100 ml. of dimethylformamide, is heated in the presence of 40 grams of potassium carbonate for 7 hours at 150° C.; the potassium chloride formed is then filtered off and the filtrate is evaporated under reduced pressure. The oily residue obtained is dissolved in 200 ml. of ethanol at boiling. On cooling, there are obtained 35 grams of crystals which are recrystallized from 250 ml. of ethyl acetate to yield 25 grams of 1-(3',3',3'-triphenylprop-1'-yl)-4-(pyrid-2''-yl)-piperazine melting at 148° C.

By the method described in Example 1, starting from the selected starting materials of Formulas II and III, are prepared the various compounds having different substituents as noted in the following table.

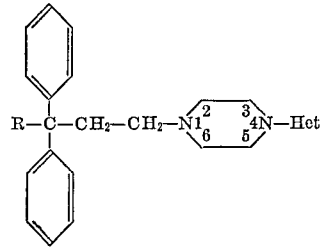

| No. Ex. | R | Het | Melting point |
|---|---|---|---|
| 2 | H |  | 96–101° C. |
| 3 | H |  | 210–215° C. (2 HCl) |
| 4 | C₆H₅ |  | |
| 5 | C₆H₅ |  | |
| 6 | C₆H₅ |  | 173° C. (Kofler) |
| 7 | C₆H₅ |  | |

TABLE—Continued
| No. Ex. | R | Het | Melting point |
|---|---|---|---|
| 8 | C₆H₅ | 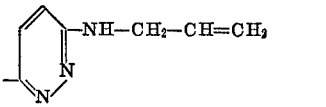 | 170–178° C. (3 HCl) |
| 9 | C₆H₅ | 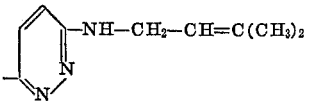 | |
| 10 | C₆H₅ | 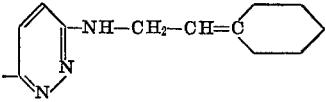 | |
| 11 | C₆H₅ | 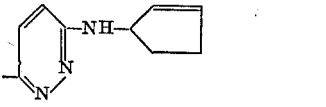 | |
| 12 | C₆H₅ | 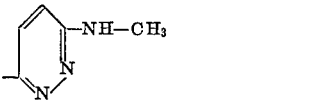 | |
| 13 | C₆H₅ |  | 148–150° C. |
| 14 | C₆H₅ | 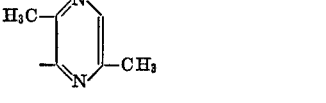 | 270–275° C. capillary (2 HCl, 1 H₂O) |
| 15 | C₆H₅ |  | |
| 16 | C₆H₅ |  | 182–185° C. (2 CH₃SO₃H, 1 H₂O) |
| 17 | C₆H₅ |  | 242–244° C. capillary (2 CH₃SO₃H) |
| 18 | C₆H₅ |  | |
| 19 | C₆H₅ | 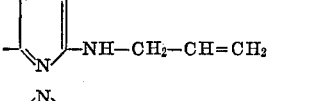 | 250–255° C. capillary (2 HCl, 2 H₂O) |
| 20 | C₆H₅ | 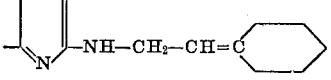 | |
| 21 | C₆H₅ | 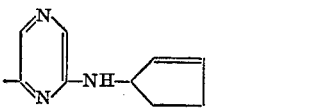 | |
| 22 | C₆H₅ | 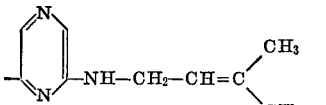 | |

TABLE—Continued

| No. Ex. | R | Het | Melting point |
|---|---|---|---|
| 23 | $C_6H_5$ | pyrimidinyl-NH-CH$_2$-CH=CH$_2$ | |
| 24 | $C_6H_5$ | pyrimidinyl-NH-CH$_3$ | |
| 25 | $C_6H_5$ | 1,3,5-triazinyl | 225–233° C. capillary (2 HCl) |
| 26 | $C_6H_5$ | 1,3,5-triazinyl-NH$_2$ | |
| 27 | $C_6H_5$ | 1,3,5-triazinyl(NH$_2$)-NH$_2$ | 325–346° C. capillary (2 CH$_3$SO$_3$H) |
| 28 | $C_6H_5$ | 1,3,5-triazinyl-NH-CH$_3$ | |
| 29 | $C_6H_5$ | 1,3,5-triazinyl-NH-CH$_2$-CH=CH$_2$ | |
| 30 | $C_6H_5$ | thiazolyl | 158–162° C. (2 CH$_3$SO$_3$H) |
| 31 | $C_6H_5$ | imidazolyl | |
| 32 | $C_6H_5$ | methyl-isoxazolyl | |
| 33 | $C_6H_5$ | thiadiazolyl | |
| 34 | $C_6H_5$ | methyl-isoxazolyl | |
| 35 | $C_6H_5$ | triazolyl | |

The pharmacological study of the new compounds gave the following results:

The acute toxicity is very low and the $LD_{50}$, studied in mice, is situated between 125 and 450 mg./kg. by the intraperitoneal route, and between 1,000 and 4,000 mg./kg. when administered orally.

The study of the analgesic activity in mice, as per the hot plate method of Woolf and MacDonald, shows an increase of the licking time of the mouse's paw ranging from 25 to over 100% with doses of 10 to 40 mg./kg. intraperitoneally and of 20 to 100 mg./kg. orally.

This same notable analgesic activity may also be demonstrated by the method of Randall and Sellito (Arch. Int. Pharmacodyn. 111, 409–419 (1957)) in the rat. An increase of the threshold of pain-perception of more than 100% is noted with doses often as weak as 10 mg./kg. orally.

The anti-inflammatory activity was demonstrated on the planta oedema of the rat's paw induced by carrageenin (Winter, C. A. et al., Proc. Soc. Exp. Biol. Med. III, 544–547 (1962)). An inhibition from 20 to 30% of the oedema is observed in comparison with the untreated animals, 3 hours after the treatment with doses of 20 to 80 mg./kg. P.O. of the new compounds.

The new compounds also possess a potent antitussive activity which can be demonstrated in the guinea-pig submitted to the inhalation of an aerosol of citric acid (amended method of Bickerman Am. J. Med. Sc. 228, 156 (1954)). It was observed that 10 to 30 mg./kg. P.O. of these compounds inhibit from 50 to 60% the fits of coughing provoked by citric acid.

The toxicological and pharmacological properties, hereabove related, enable the use of these new compounds in human and animal therapy, especially as analgesic, anti-inflammatory and antitussive agents for the alleviation of pain, inflammation, and cough.

The compounds of the invention may be administered in different pharmaceutical forms, such as tablets, dragées, capsules, suppositories, or drinkable or injectable solutions, in association with the usual pharmaceutical solid or liquid carriers such, for example, as distilled water, glucose, lactose, talc, starch, gum-arabic, magnesium stearate or ethyl cellulose.

The doses may vary from 10 to 100 mg./kg. depending upon the specific compound involved, the indication for which administered and the route of administration, whether oral, rectal or parenteral administration, will be apparent to one skilled in the art.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, buccally, intra-muscularly, and intraperitoneally.

As representative of living animal bodies which may be treated with the compounds and compositions of the invention, and according to the method of treating of the invention, for alleviation of the same and/or similar conditions as those described, may be mentioned the following: domestic animals such as dogs and cats, farm animals such as horses, cows, sheep, and goats, fur-bearing animals such as mink, seal, muskrat, fox, raccoon, ermine, and weasel, and zoo animals such as bears, antelopes, foxes, monkeys, baboons, and the like.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 1.0 milligram, may be used in cases of administration to subjects having a relatively low body weight, unit dosages are usually ten milligrams or above and preferably twenty-five, fifty, or one-hundred milligrams, or even higher, depending of course upon the subject treated and the particular result desired, as will be apparent to one skilled in the art. The active agents of the invention may be combined for administration with other pharmacologically active agents, such as, sedatives, tranquilizers, steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established medical and/or veterinary principles.

Various modifications and equivalents will be apparent to one skilled in the art and may be made in the compounds, compositions, and methods of the present invention without departing from the spirit or scope thereof, and it is therefore to be understood that the invention is to be limited only by the scope of the appended claims.

We claim:

1. A compound selected from the group consisting of (A) di- and triphenylpropyl piperazine compounds of the Formula I

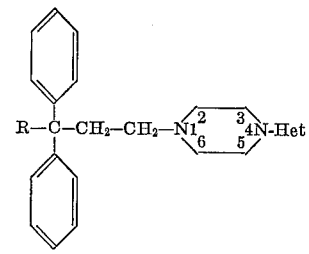

(I)

R is selected from the group consisting of hydrogen and phenyl, and

Het is selected from the group consisting of pyridazinyl, pyrazinyl and of these groups substituted by a substituent selected from the group consisting of lower-alkyl of up to 5 carbon atoms inclusive, amino, monoalkyl- and alkylene-amino of the formula —NHR' wherein R' is selected from the group consisting of lower-alkyl of up to 5 carbon atoms inclusive in straight or branched chain, cyclopropylmethyl, and alkylene

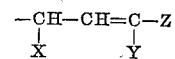

wherein X, Y, Z are selected from hydrogen and methyl, and X, Y or Y, Z are a polymethylene chain of 2 to 6 carbon atoms inclusive, and (B) physiologically acceptable addition salts thereof with organic and mineral acids.

2. The compound of claim 1 which is 1-(3′,3′,3′-triphenylprop-1′-yl)-4-(pyridazin-6″-yl)-piperazine.

3. The compound of claim 1 which is 1-(3′,3′,3′-triphenylprop-1′-yl)-4-(pyrazin-2″-yl)-piperazine.

4. The compound of claim 1 which is 1-(3′,3′,3′-triphenylprop-1′-yl)-4-(2″,5″-dimethyl-pyrazin-3″-yl)-piperazine.

5. The compound of claim 1 which is 1-(3′,3′,3′-triphenylprop-1′-yl)-4-(2″-amino-pyrazin-3″-yl)-piperazine.

6. The compound of claim 1 which is 1-(3′,3′-diphenylprop-1′-yl)-4-(pyridazin-6″-yl)-piperazine.

7. The compound of claim 1 which is 1-(3′,3′-diphenylprop-1′-yl)-4-(pyrazin-2″-yl)-piperazine.

References Cited

UNITED STATES PATENTS

| | | | |
|---|---|---|---|
| 2,857,384 | 10/1958 | Druey et al. | 260—250 X |
| 3,014,034 | 12/1961 | Druey et al. | 260—250 |
| 2,562,036 | 7/1951 | Hultquist et al. | 260—250 |
| 2,975,182 | 3/1961 | Janssen | 260—268 |
| 2,979,508 | 4/1961 | Janssen | 260—268 |
| 2,985,657 | 5/1961 | Janssen | 260—268 X |
| 3,435,036 | 3/1969 | Regnier et al. | 260—268 X |

DONALD G. DAUS, Primary Examiner

U.S. Cl. X.R.

260—248 CS, 250 R, 268 A, 268 BZ, 290 HL, 296 R, 302 R, 307 R, 308 D; 424—246, 250

UNITED STATES PATENT OFFICE
CERTIFICATE OF CORRECTION

Patent No. 3,631,043　　　　　Dated 28 December 1971

Inventor(s) Gilbert Regnier et al.

It is certified that error appears in the above-identified patent and that said Letters Patent are hereby corrected as shown below:

Col. 1 - General Formula (I); Page 1, General Formula (I)

Col. 10, CLAIM 1　　- Page 11, line 4 - CLAIM 1
Line 54
Following Formula I, insert the word -- wherein --.

Signed and sealed this 4th day of July 1972.

(SEAL)
Attest:

EDWARD M. FLETCHER, JR.　　　　　ROBERT GOTTSCHALK
Attesting Officer　　　　　　　　 Commissioner of Patents